Figure 1:
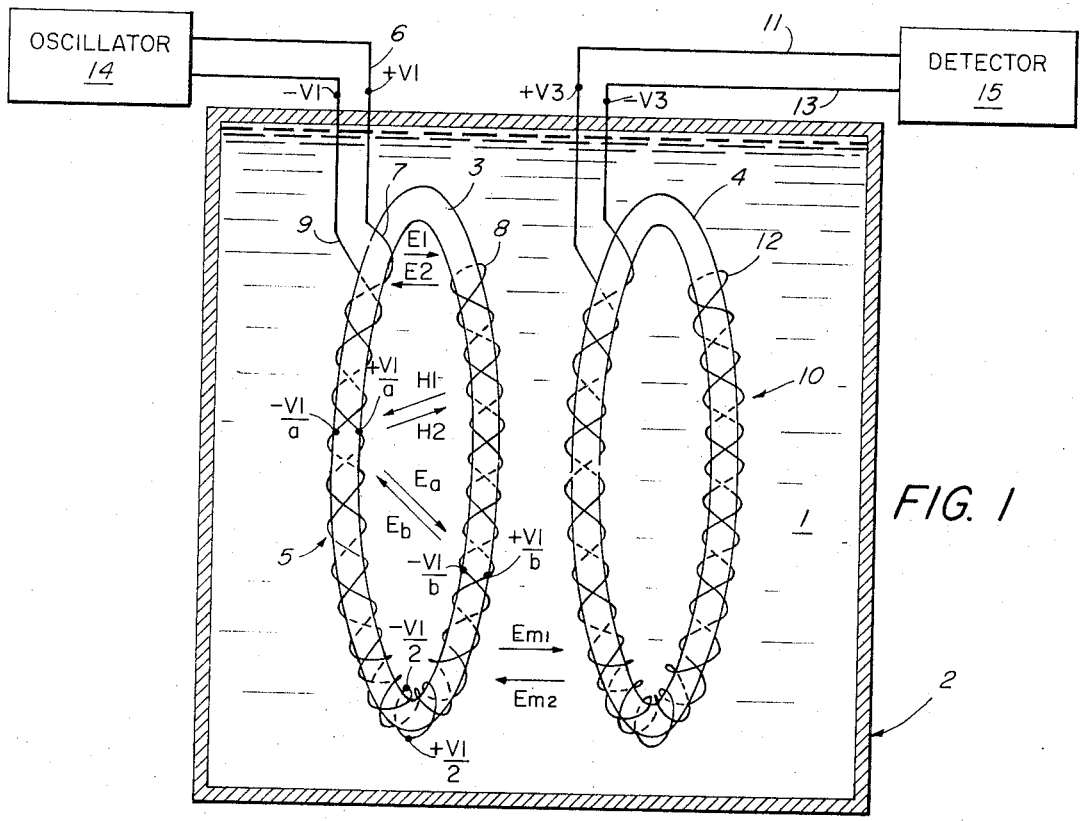

United States Patent [19]
Gross

[11] 3,806,798
[45] Apr. 23, 1974

[54] ELECTRODELESS CONDUCTIVITY MEASURING SYSTEM

[75] Inventor: T. A. O. Gross, Lincoln, Mass.

[73] Assignee: Balsbaugh Laboratories, Inc., South Hingham, Mass.

[22] Filed: Jan. 29, 1973

[21] Appl. No.: 327,587

[52] U.S. Cl. .............................. 324/30 R, 336/181
[51] Int. Cl. ........................................ G01n 27/42
[58] Field of Search............... 324/30 R, 30 A, 127; 336/181

[56] References Cited
UNITED STATES PATENTS
2,542,057  2/1951  Relis .................................. 324/30 A
3,449,703  6/1969  Steen .................................... 336/181

Primary Examiner—Michael J. Lynch
Attorney, Agent, or Firm—John W. Ericson

[57] ABSTRACT

An electrodeless system for measuring conductivity in fluids, incorporating a pair of toroidal ferromagnetic cores to be immersed in a fluid and disposed in essentially contiguous relationship, in which the winding on one core is excited by an oscillator at a constant frequency somewhat above the audio range, and in which the windings on both cores are so arranged that there is neither electromagnetic nor electrostatic unbalance from turn to turn of the assembled windings, so that the only coupling between the transmitter and receiver coils is effected by the fluid loop which links the cores.

17 Claims, 3 Drawing Figures

3,806,798

ELECTRODELESS CONDUCTIVITY MEASURING SYSTEM

This invention relates to measuring, testing and control and particularly to the determination of the conductivity of fluids for the purpose of measurement, testing and control.

The conductivity of a fluid is an important measure of its properties for many purposes. For example, the conductivity of water is determined by its ionizable constituents, which contribute to the conductivity of the solution in proportion to their concentration and ionization constants.

A typical approach to the measurement of the conductivity of such solutions is to dispose a pair of electrodes in the fluid system, to impose an alternating or direct voltage between the electrodes, and to measure the current flowing as an index of the conductivity of the fluid in the path between the electrodes.

One disadvantage of this procedure is that electrolysis in the vicinity of the electrodes produces changes in the contact resistances of the electrodes that appear as increases or decreases in the conductivity of the system. These may be quite difficult to separate from the effect of the conductivity of the solution in evaluating and using the measurement, especially for the purposes of control. In particular, in the measurement of the conductivity of solutions with very low concentrations of ionizable constituents, such as drinking water and the like, the buildup of scale on the electrodes materially affects the conductivity of the measuring circuit so that calibration is very difficult to maintain over a reasonable period of time. A requirement for frequent maintenance to recalibrate equipment to account for this kind of change is onerous and undesirable in quality, and process, control applications.

Efforts have been made to eliminate this problem by the introduction of electrodeless systems, such as that shown and described in U.S. Pat. No. 2,542,057, issued on Feb. 20, 1951 to M. J. Relis for Method And Apparatus For Measuring The Conductivity Of An Electrolyte. In that patent, it is proposed to immerse two toroidal ferromagnetic cores in a solution, and to couple an oscillator to a winding on one of the cores. A winding on the other core is coupled to a detecting circuit.

Reliance on a simple functional relationship between the output voltage and the conductivity of the solution is placed principally upon the fact that most of the flux induced by the first winding is confined to its toroidal core, so that mutual coupling between the cores is substantially eliminated. However, in the Relis system, it was found necessary to compensate for residual coupling between the primary and secondary windings by introducing an external compensating network to buck out the interwinding coupling existing at minimum, or zero, conductivity.

While the Relis approach is very promising from the standpoint of reducing electrolytic deterioration of the electrodes, and of the solution under test, it has pronounced disadvantages, particularly at the lower levels of conductivity, in that the compensation is not linear, because the residual electromagnetic and electrostatic couplings are mutually affected by resistive leakage through the solution, and by the resistance of the solution to the flow of eddy currents, in such a way that calibration at a single point is inadequate to effect compensation. Moreover, external compensating apparatus is inherently cumbersome, complex and expensive, even if efficacious. Accordingly, the object of my invention is to facilitate the measurement of the conductivity of solutions without the use of electrodes, or of a supplementary compensating network.

Briefly, the above and other objects of my invention are attained by a conductivity measuring circuit in which two toroidal ferromagnetic cores are disposed in closely spaced, concentric relationship and coupled by a fluid linking both cores. The cores may be immersed in the fluid, or they may be disposed about a common link in a fluid loop.

A primary winding on one of the cores is wound from a starting point about the core to a termination point adjacent the starting point, and then back to the starting point in the same sense. If desired, winding in this fashion may be continued, with each course from the starting point to the termination point being accompanied by a course from the termination point back to the starting point, in the manner of a resin-core current transformer such as that shown in U.S. Pat. No. 3,449,703 to Steen, for example. A secondary winding of the same kind is wound on the other core. I have found that if both cores are made of high permeability ferromagnetic material, very low conductivities can be measured accurately without the use of external compensating networks of the kind required with the conductivity measuring system described in the above cited patent to Relis.

The manner in which the apparatus of my invention is constructed, and its mode of operation, will best be understood in the light of the following description, together with the accompanying drawings, of various illustrative embodiments of my invention.

Figure 2:
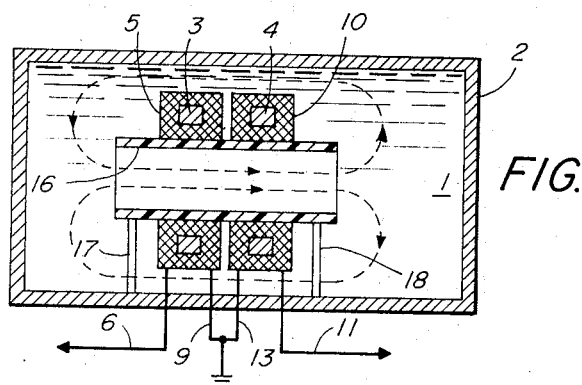
Figure 3:
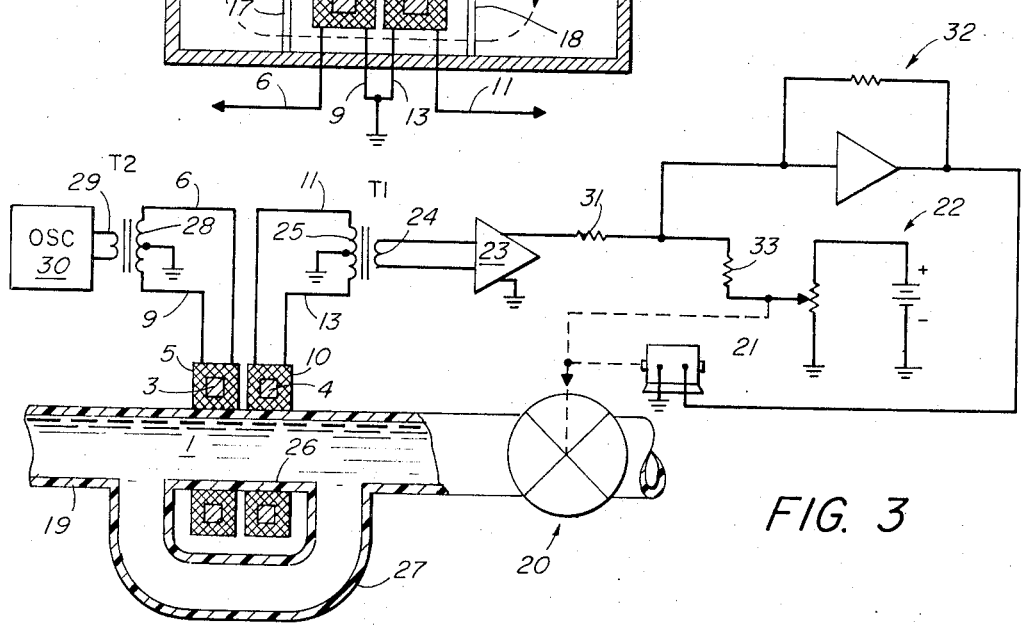

In the drawings, FIG. 1 is a schematic elevational sketch, with parts shown in cross section, of a conductivity measuring system in accordance with my invention; FIG. 2 is another schematic elevational sketch, with parts omitted and parts shown in cross section, of a particular embodiment of my invention; and FIG. 3 is a schematic block and wiring diagram of a flow control system in accordance with my invention.

Referring to FIG. 1, I have shown schematically the essential functional elements of a conductivity measuring system in accordance with my invention. The apparatus is arranged to measure the conductivity of a body of fluid 1 in a suitable container 2.

Toroidal cores 3 and 4 are immersed in the fluid 1 and disposed in concentric and essentially contiguous relationship, though for clarity I have shown them spaced considerably more than would be desirable in practice, at least for the measurement of very low conductivities. The cores 3 and 4 are preferably made of high permeability ferromagentic materials, such as ferrite or the like.

A primary winding generally designated 5 is disposed on the core 3. The winding 5 extends from an input lead 6 that is wound about the core 3, from a starting point 7, progressively around the core 3, in a counterclockwise sense as seen in FIG. 1, to a termination point 8 adjacent the starting point. The primary winding continues from the termination point 8 in the same sense about the core 3, from the termination point 8, clockwise as seen in FIG. 1, back to an output lead 9. If desired, the counterclockwise and clockwise course of the primary winding can be repeated to build up a desired number of ampere turns on the core 3.

It will be apparent that if the instantaneous potential of the lead 6 at the point 7 is +V1, and the potential on the output lead 9 is −V1, then the potential at the termination point 8 will be 0. In particular, the electrostatic field vector E1 between point 7 and point 8 will be equal and opposite to the electrostatic vector E2 from the exit point on the lead 9 to the point 8.

More generally, a point anywhere on the counterclockwise course of the primary winding, at a potential +V1/a, will be adjacent a point on the clockwise course at a potential −V1/a. With respect to any other pair of adjacent points on the counterclockwise and clockwise courses, at potentials +V1/b and −V1/b, respectively, the corresponding electrostatic field vectors will be equal and opposite.

The principal magnetic field induced by current flowing in the primary winding 5 will be confined to the ferromagnetic core 3. The electromagnetic field vector H1 induced by current flowing in the single turn formed by the portion of the primary winding 5 between the points 7 and 8 will be equal and opposite to the electromagnetic field vector H2 induced by current flowing in the single turn formed by the portion of the winding 5 between the point 8 and the output lead 7. Thus, there will be essentially no net external electromagnetic or electrostatic field induced by currents flowing in the primary winding 5.

A secondary winding 10 is wound on the core 4 in exactly the manner described above for the primary winding 5. An input lead 11 is wound about the core 4 in any desired direction and in a counterclockwise sense to a point 12, and thence in the same direction and in a clockwise sense to an output lead 13. The direction of winding about the core, and the sense in which the input and output courses proceed around the core, is immaterial so long as all turns are in series aiding relationship and the input and output courses proceed in opposite directions about the core to a common feed point.

It will be apparent that no external field is induced by currents flowing in the secondary winding 10, for the reasons discussed above in connection with the primary winding 5. More importantly, the location of the exit point for the leads 11 and 13 of the secondary winding, relative to the exit point for the leads 6 and 9 of the primary winding, is not critical. Prior known constructions of paired windings on toroidal cores can be mutually isolated by relative rotation and translation of the cores at a given frequency and for a given conductive environment if the windings are carefully shielded and mutually balanced with respect to ground. This tuning procedure is unnecessary with the construction of my invention. Moreover, it is not essential, although it is convenient and preferable, to balance the windings with respect to ground. And shielding of the windings has been found to be unnecessary for most applications.

Assuming that the secondary lead 11 is at an instantaneous potential +V3, and that the secondary lead 13 is at a corresponding potential −V3, the potential at any point on the counterclockwise course about the core 4 will be +V3/c, and the potential on the ajdacent turn of the clockwise course will be −V3/c. It will be apparent that the electrostatic field vector between the secondary turn at +V3/c and any point on the clockwise course of the primary winding at −V1/a will be equal and opposite to the electrostatic field vector between the adjacent secondary turn at −V3/c and the adjacent primary turn at +V1/a. Thus, absent a conductive medium linking both cores, there will be no mutual electrostatic coupling. Since there is essentially no external magnetic field induced by currents flowing in either winding, it will be apparent that the windings are mutually isolated if immersed in an insulating space.

The primary winding 5 is connected to a conventional oscillator 14, for excitation at constant voltage, and at a frequency which is preferably in the range of from 10 KHz to 150 KHz, and most preferably about 20 KHz. The output leads 11 and 13 of the secondary winding 10 are connected to any suitable voltage or current detecting circuit 15. The output sensed by the detecting circuit 15 will be essentially zero in the absence of a conductive fluid 1 linking the cores 3 and 4.

The presence of a conducting fluid 1 linking the cores 3 and 4 will cause coupling between the primary and secondary windings to an extent determined by the conductivity of the fluid 1. The fluid 1 essentially forms a single shorted turn linking both windings.

FIG. 2 shows one form of apparatus embodying the invention and useful for the measurement of the conductivity of a solution. The fluid 1 whose conductivity is to be measured is enclosed in a container 2, as in FIG. 1.

The core 3 and its primary winding 5 are disposed in concentric and essentially contiguous relationship to the core 4 and its secondary winding 10 by mounting the coils on an insulating pipe section 16 that is mounted in the container 2 by any suitable means, shown as insulating supports 17 and 18 fixed to the pipe 16 and to the container 2. The leads 6, 9, 11 and 13, suitably insulated, are brought out of the container 2 in any conventional manner for connection to external circuits. As shown, a pair of leads, such as 9 and 13, may be connected to a common ground.

FIG. 3 shows a preferred embodiment of the invention in which the electrodeless conductivity measuring apparatus of my invention is employed for the control of a stream of fluid in a chemical process application; for example, for the control of a recycle stream in a distillation process. A conduit 19, of any suitable insulating material such as glass, plastic, or the like, conveys a fluid 1 whose conductivity is to be used as a measure of the rate at which the fluid will be allowed to flow through the conduit 19.

The rate of flow of the fluid 1 though the conduit 19 is governed by a servo-controlled valve 20, of any conventional construction. The position of the valve 20 is controlled by a servomotor 21 in response to the error signal represented by the algebraic sum of a position signal produced by a conventional valve position signal generator 22 controlled by the valve, and the output signal produced by an amplifier 23 in dependence on the conductivity of the fluid 1 in a manner to be described.

The amplifier 23 has an input circuit connected to the secondary winding 27 of a transformer T1. The transformer T1 has a primary winding 25 with a center tap grounded, and terminals connected to the leads 11 and 13 of the secondary winding 10 on the core 4.

The cores 3 and 4, and their windings 5 and 10, are disposed in concentric and essentially contiguous relationship on a throughput nipple 26 forming a continuation of the conduit 19. A bypass conduit 27 provides a fluid path linking the cores 3 and 4.

The primary winding 5 on the core 3 has its leads 6 and 9 connected to the outer terminals of a secondary winding 28 on a transformer T2. The secondary winding 28 of the transformer T2 has a grounded center tap, as shown.

The transformer T2 has a primary winding 29 connected to the output terminals of a constant voltage, constant frequency oscillator 30, such as the oscillator 14 described above.

The output signal from the amplifier 23, which is proportional to the conductivity of the fluid 1, is supplied through a summing resistor 31 to the active input terminal of a conventional summing amplifier 32. A second summing resistor 33 supplies the output signal of the valve position repeating signal generator 22 to the amplifier 32. The position of the valve 20 is accordingly adjusted in accordance with the conductivity of the fluid 1 to adjust the flow of the fluid 1 through the conduit 19 to maintain the conductivity of the fluid 1 within desired limits.

While my invention has been described with reference to the details of particular illustrative embodyments, many changes and variations will be apparent to those skilled in the art upon reading my description. Such can obviously be made without departing from the scope of my invention.

Having thus described my invention, what I claim is:

1. An electrodeless conductivity measuring probe, comprising first and second toroidal ferromagnetic cores, means mounting said cores in adjacent coaxial relationship, and windings on said cores, each winding on each core comprising a plurality of turns, extending from a first terminal adjacent a first point on the core about and around the core in continuous series aiding relationship back and forth between said first point and a second point adjacent said first point and terminating at a terminal adjacent said first terminal, each of said turns being adjacent a turn of equal and opposite polarity in the presence of a current flowing in a predetermined sense through said winding.

2. An electrodeless conductivity measuring probe, comprising first and second toroidal ferromagnetic cores, means mounting said cores in adjacent relationship, a primary winding on said first core, a secondary winding on said second core, each of said windings extending in a series of at least one pair of courses from an input terminal, in a course wound about its associated core in a predetermined sense from a starting point, around the core, to a termination point adjacent said starting point and returning in turns in the same sense, in a course extending from said termination point to said starting point.

3. The apparatus of claim 1, further comprising an oscillator connected to a first of said windings on a first of said cores to apply an alternating voltage at a predetermined frequency to said first winding, and means connected to the second of said windings on the other of said cores to detect the voltage induced in said second windings by a conductive medium linking said cores.

4. The apparatus of claim 2, further comprising means for applying a voltage at a predetermined frequency across said primary winding, and means connected to said secondary winding for detecting a voltage induced across said secondary winding by a conductive medium linking said cores.

5. Apparatus for measuring the conductivity of a fluid, comprising first and second toroidal ferromagnetic cores, a primary winding on said first core comprising at least a first course of turns extending around said first core from a starting point to a termination point adjacent said starting point and returning from said termination point to said starting point around said first core in a second course for each first course in turns each mating with a corresponding turn of said first course, and a secondary winding on said second core comprising at least a first course of turns extending around said second core from a second starting point to a second termination point adjacent said second starting point and returning from said second termination point to said second starting point around said second core in a second course for each first course in turns each mating with a corresponding turn of said first course on said second core.

6. The apparatus of claim 5, further comprising means for exciting said primary winding with a constant voltage at a predetermined frequency, and means connected to said secondary winding for producing a signal in accordance with the voltage induced across said secondary winding.

7. The apparatus of claim 6, further comprising means for mounting said cores in closely spaced adjacent coaxial relationship.

8. The apparatus of claim 6, further comprising a fluid medium linking said cores.

9. The apparatus of claim 7, further comprising a fluid medium linking said cores.

10. Apparatus for controlling the flow of a fluid in dependence on the conductivity of the fluid, comprising a first toroidal ferromagnetic core, a second toroidal ferromagnetic core, means mounting said cores in mutually linked relationship by said fluid, a primary winding on said first core having adjacent turns each of equal and opposite polarity when a voltage is applied across said primary winding, said primary winding extending from a first terminal adjacent a first point on said first core about and around said first core in continuous series aiding relationship back and forth between said first point and a second point adjacent said first point and terminating in a second terminal adjacent said first terminal, a secondary winding on said second core having adjacent turns each of equal and opposite polarity when a voltage is induced across said secondary winding, said secondary winding extending from a third terminal adjacent a third point on said second core about and around said core in continuous series aiding relationship back and forth between said third point and a fourth point adjacent said third point and terminating in a fourth terminal adjacent said third terminal, means for inducing an alternating voltage across said primary winding, means for detecting the voltage induced across said secondary winding, and flow control means for adjusting the rate of flow of said fluid in a predetermined path in dependence on the voltage detected by said detecting means.

11. The apparatus of claim 10, in which said cores are immersed in said fluid.

12. The apparatus of claim 11, in which said mounting means mounts said cores in closely spaced adjacent coaxial relationship.

13. The apparatus of claim 10, in which said path comprises a conduit including a parallel path forming a fluid loop, and in which said mounting means mounts said cores in adjacent coaxial relationship above one leg of said loop.

14. Means for measuring the conductivity of a fluid, comprising first and second toroidal cores adapted to be linked by the fluid, a first winding on said first core comprising a first course of turns extending about and around said first core from a first starting point to a first termination point and returning from said first termination point to said first starting point in a second course of turns each mated with a turn of said first course so that essentially no external electromagnetic field is produced when a voltage is applied to said first winding, and a second winding on said second core comprising a first course of turns extending about and around said second core from a second starting point to a second termination point and returning from said second termination point to said second starting point in a second course of turns each mated with a turn of said first course on said second core so that essentially no external electrostatic field is produced by said second winding when flux is induced in said second core.

15. The apparatus of claim 14, further comprising means for applying an alternating voltage at a predetermined frequency to said first winding, and means connected to said second winding for producing an output signal in accordance with the voltage induced across said second winding.

16. The apparatus of claim 15, in which said cores are mounted in closely spaced coaxial relationship.

17. The apparatus of claim 16, in which said first termination point is adjacent said first starting point, and in which said second termination point is adjacent said second starting point.

* * * * *